BEAN & TYSON.
Wheel-Cultivator.
No. 69,750.  Patented Oct. 15, 1867.
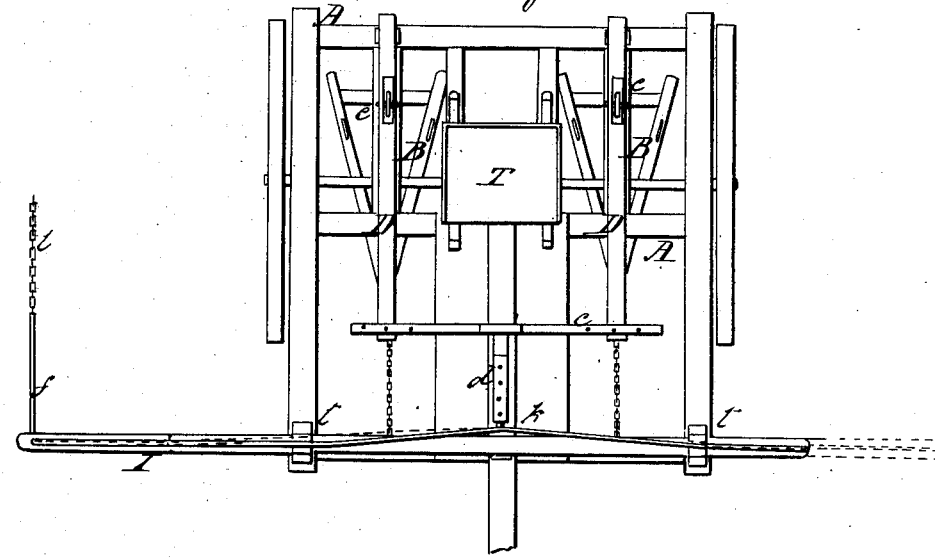
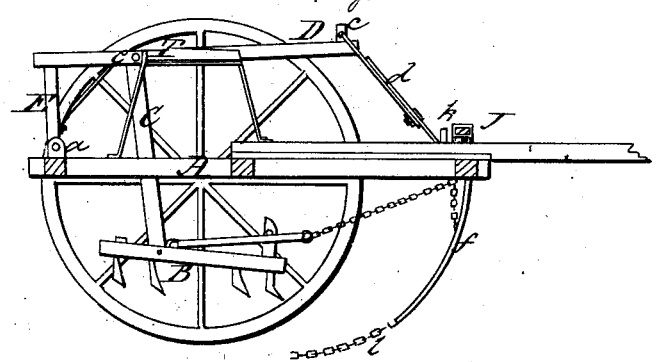

United States Patent Office.

HENRY BEAN, OF SCHUYLKILL, AND JESSE D. TYSON, OF LOWER PROVIDENCE, PENNSYLVANIA.

Letters Patent No. 69,750, dated October 15, 1867.

---

IMPROVEMENT IN CULTIVATORS.

---

The Schedule referred to in these Letters Patent and making part of the same.

---

TO ALL WHOM IT MAY CONCERN:

Be it known that we, HENRY BEAN, of Schuylkill, Chester county, Pennsylvania, and JESSE D. TYSON, of Lower Providence, in the county of Montgomery, and State of Pennsylvania, have invented certain new and useful Improvements in Cultivators; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention we will proceed to describe it.

Our invention consists in certain improvements in the cultivating machine patented to J. W. Tyson August 14, 1866, and February 27, 1867, said improvements relating to a device for marking the ground, and also in an arrangement of devices for controlling and elevating the cultivators or other implements used in connection with the frame.

Figure 1 is a top plan view, and

Figure 2 is a longitudinal vertical section, taken through the centre.

The main frame A is constructed as described in the patents above mentioned, but the chains and pulleys therein used for raising and lowering the cultivators, ploughs, or other implements used, are dispensed with, and other devices are substituted in their stead, as follows: To the rear end of the frame we pivot two uprights, E, one on each side, and to their upper ends rigidly secure horizontal levers D, as shown in fig. 2. These levers extend to the front of the seat T, and are connected at their front end by a cross-bar, c, as shown in fig. 1. The standards C, which are secured to the cultivators B, or such other implements as may be used in their stead, are pivoted at their upper ends to the levers D, as shown at e, fig. 2, so that by raising the levers D the implements will be raised, or by means of the levers they may be held firmly down and made to enter the ground when the latter is hard or stony. To the cross-bar c a rod, d, is hinged, as represented in figs. 2 and 3, this rod d being composed of two pieces fastened together by bolts or similar means, so that it may be adjusted in length as required. By means of this brace-rod the levers D, and thereby the implements connected to them, may be held up when raised from the ground, as represented in fig. 2. For the purpose of marking the ground, and thus affording a means of guiding the team, so as to make the rows parallel across the field, we provide a marking device. This device consists of a bar, I, placed transversely across the front part of the frame A, and arranged to slide to and fro in suitable guides, t, as shown in fig. 1. At each end of this bar I a hole is bored, through which a cord, f, is passed, this cord being somewhat longer than the bar I, and having a short piece of chain, l, fastened to each end, and so arranged that when the cord is drawn to one side far enough to raise the chain at one side of the machine clear of the ground, the chain at the opposite end of the bar will drag on the ground. On the platform in front of the seat, and near to the bar I, we place block or bolt k, having a slit or notch in its top of proper size to permit the cord f to rest therein, said block or bolt k also serving as a rest for the end of the brace-rod d to rest against, as represented in fig. 3.

When it is desired to make a mark across the field, to serve as a guide, the bar I is slid over to one side until its end projects the required distance beyond the frame A, which distance will be regulated by the proposed width of the rows apart. The cord f is then drawn over until the chain is raised from the ground at its inner end, by which the chain l at the outer end will be lowered to the ground, as represented in fig. 1. By having a series of knots in the cord f so arranged as to let the cord move to the required distance and bring the knot up against the side of the rest, the movements of the bar and cord can be regulated without difficulty. When the field has been once crossed, and it is desired to return, the position of the bar I, with its cord and chains, is reversed, it being shoved over to the opposite side of the frame, and thus at each crossing a mark is made upon the ground to guide the operator on his return. If preferred, a series of holes may be made in the bar I, and pins used, to limit and regulate its movement, the holes being arranged to suit rows of various widths. The bar I may be arranged to be removed from its place, or it may be jointed, so that when shoved entirely to one side the projecting part can be folded over on the frame for convenience in passing through gates, bars, &c.

Having thus described our invention, what we claim is—

1. The combination, with the main frame A, of the levers D and brace-rod d, arranged to operate as shown and described.

2. The sliding bar I, provided with the cord f and chains l, or their equivalents, when arranged to operate as and for the purpose set forth.

HENRY BEAN,
JESSE D. TYSON.

Witnesses:
JOHN GETTY,
ANN E. GETTY.